United States Patent [19]

Decker

[11] 4,049,146
[45] Sept. 20, 1977

[54] FIFTH WHEEL ATTACHMENT

[76] Inventor: Karl Decker, Lenape Way, Box 144, Ironia, N.J. 07845

[21] Appl. No.: 689,353

[22] Filed: May 24, 1976

[51] Int. Cl.² .......................... B62D 53/08; B66F 9/12
[52] U.S. Cl. ................................ 214/620; 280/415 A
[58] Field of Search .............. 280/433, 415 A, 425 R; 214/620, 621, 145

[56] References Cited

U.S. PATENT DOCUMENTS

| | | | |
|---|---|---|---|
| 2,809,759 | 10/1957 | Manker | 280/425 R |
| 3,599,818 | 8/1971 | Stanton | 214/620 |
| 3,881,619 | 5/1975 | Morris | 280/415 A |
| 3,930,585 | 1/1976 | Lynch | 214/620 |

*Primary Examiner*—Joseph F. Peters, Jr.
*Assistant Examiner*—John A. Pekar

*Attorney, Agent, or Firm*—Leonard W. Suroff

[57] ABSTRACT

A portable self-contained fifth wheel device for detachable mounting on a vehicle for pulling a wheeled container comprising a frame for detachable connection on a wheeled vehicle of the type having two support arms with the frame including a pivotally mounted support member for detachable connection to a wheeled container. The frame has two interlocking members including a hollow housing in the form of a guide track for slideably receiving the support arms, and the housing includes a manual actuated locking means for selective locking engagement with the support arms for supportably mounting the container on the fifth wheel device. The device further includes an air tank with connecting air hoses to be used in connection with the wheeled container for releasing the air brakes thereon.

3 Claims, 2 Drawing Figures

FIFTH WHEEL ATTACHMENT

BACKGROUND OF THE INVENTION

The present invention relates in general to a fifth wheel device for mounting on a vehicle for towing a wheeled container, and more specifically relates to a novel portable, self-contained fifth wheel device for manually detachable mounting on a vehicle, such as a fork lift truck or the like, for pulling a wheeled container, such as a trailer.

Such fifth wheel device has particular application, for example, in moving trailers of the tractor-trailer type from one location to another, such as in dock areas, freight terminals, and at other such locations where tractor-type trailer units are employed for the transportation of cargo.

Heretofore, trailers of the type employed with tractor-trailer units have been moved from location to location at the loading and/or unloading areas primarily either by large type cranes or by specially designed tractor units having a fifth wheel for engagement with the trailer chassis. It will be appreciated that such large type cranes are not only costly from an initial investment and maintenance standpoint, but also are not sufficiently efficient for quick and easy movement or "spotting" of the trailers since they are relatively slow moving and often, due to their size, cannot be used in areas where space is at a premium. In addition, such cranes require highly skilled operators and often cannot handle extremely heavy cargo loads held by the containers. Although fifth-wheel type tractors may be employed for moving and spotting the trailers, such vehicles are relatively expensive and again require the use of special operators.

A portable fifth wheel device is disclosed in U.S. Pat. No. 3,881,619 but this device requires a complex system for coupling the portable fifth wheel device to the vehicle, such as a fork lift truck. Accordingly, should such type of equipment break down, there results considerably increased cost by reason of the down-time encountered in order to repair such device resulting in costly delays in loading and/or unloading the cargo from ships, trains and the like. Moreover, due to the vital time schedules involved with the present day transportation facilities, it is imperative that the cargo be loaded and/or unloaded with the minimum time and effort within the given time schedule.

OBJECTS OF THE INVENTION

An object of the present invention is to provide a portable self-contained fifth wheel device for detachable mounting on a vehicle, such as a fork lift truck.

Another object of the present invention is to provide a portable self-contained fifth wheel device that may be manually connected to the fork lift truck and includes an air tank with connecting air hoses for releasing the air brakes on the wheeled container.

Other objects and advantages of the invention will become obvious from the disclosure hereinafter set forth.

SUMMARY OF THE INVENTION

According to the present invention a portable, self-contained fifth wheel device for detachable mounting on a vehicle, such as a fork lift truck or the like is provided for towing a wheeled container such as a trailer. The portable device includes a frame for detachable connection to the two frames of a fork lift truck and including a pivotally mounted fifth wheel for detachable connection to a wheeled container. The frame includes locking means manually operated for receiving the spaced apart support arms of the fork lift truck and locking them in place. The portable device further includes an air tank with connecting air hoses to be used in connection with the wheeled container for releasing the air brakes thereon.

BRIEF DESCRIPTION OF THE DRAWINGS

Although the characteristic feature of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DESCRIPTION OF PREFERRED EMBODIMENT

Figure 1:
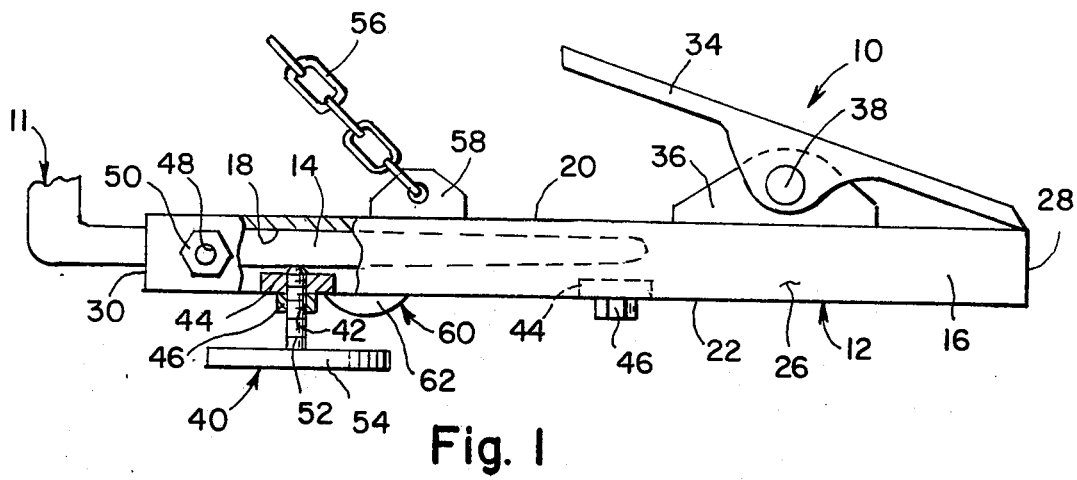
FIG. 1 is a fragmentary, side elevation view illustrating the fifth wheel device of the invention for moving the chassis of a trailer mounted on a conventional type fork lift truck.
Figure 2:
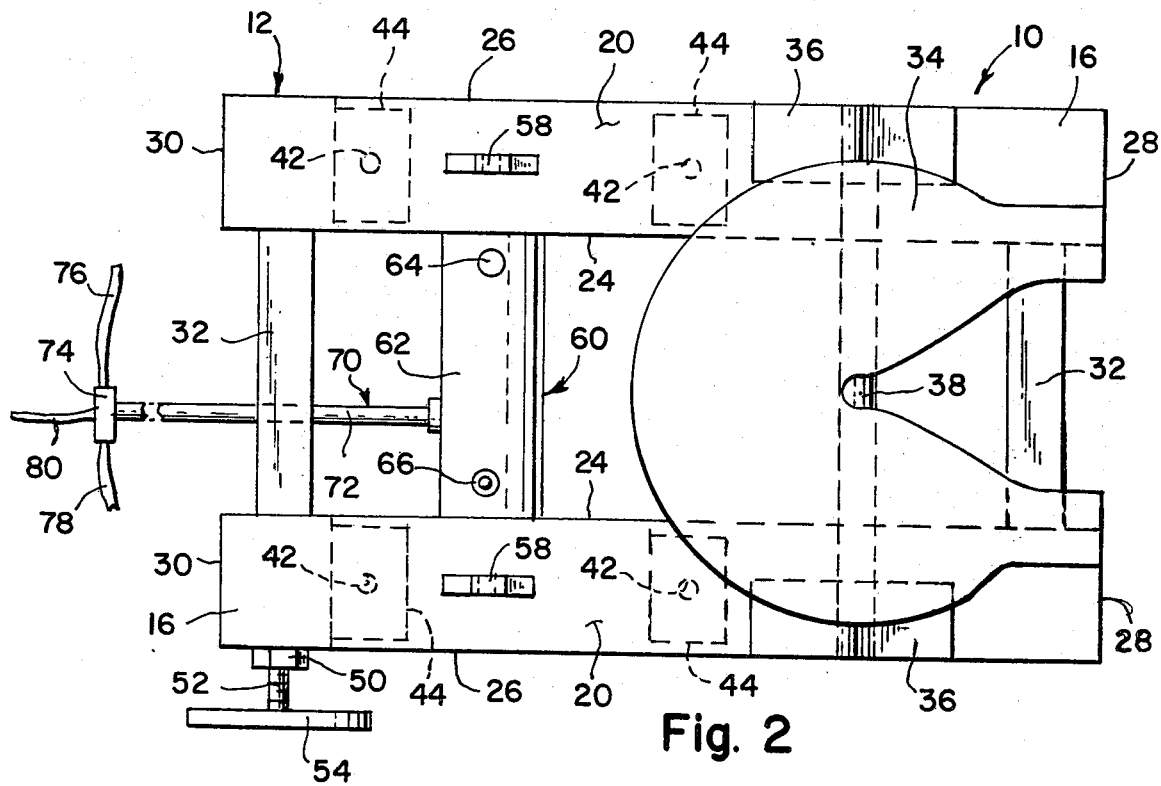
FIG. 2 is a fragmentary, top plane view of the portable fifth wheel device of the invention.

The present invention as illustrated in FIGS. 1 and 2 provide for a portable, self-contained fifth wheel device 10 for detachable mounting on a vehicle, such as a fork lift truck 11 or the like, for towing a wheeled container, such as a trailer (not show). The device 10 includes a frame 12 for detachable connection on a wheeled vehicle of the type having a pair of spaced apart support arms 14. The frame 12 has a pair of spaced apart, oppositely disposed housings 16 including elongated hollow channels 18 for receiving the corresponding pair of support arms 14 therein. Each housing has an upper surface 20 spaced apart lower surface 22, inner surface 24, and outer surface 26, which define the housings 16. Each housing 16 has a front end 28 and a rear end 30 in spaced apart relation to each other which length may be several feet. To join the respective housings 16 together cross supports or channels 32 are provided which maintain the frame 12 in a rigid construction since the above parts described are made out of metal and may be welded together.

The frame 12 includes a fifth wheel 34 pivotally mounted to the frame 12 by a pair of bases 36 mounted respectively on the upper surface 20 of each housing 16 and held in place by a hinge pin 38 extending transversely through each base 36 and fifth wheel 34, the construction of which is well-known in the art.

To provide for the frame 12 to be retained in fixed position to the supporting arms 14 locking means 40 is provided with respect to the housings 16. The locking means 40 provides for selective engagement when the support arms 14 are disposed in the housing channel 18. The locking means 40 includes in each channel 18 a member in which a respective arm 14 is held in clamped position relative to the frame 12. The locking means 40 includes a pair of threaded sockets 42 extending into the hollow channels 18 on each of the housings 16 along the lower plane 22 and may consist of a plate 44 with a nut 46 extending below the surface 22. In addition, in a similar manner, a threaded socket 48 contains in the form of a nut 50 may extend on each outside surface 26 of each housing 16. A threaded member 52 extends through the respective socket 42 and 48 into the housing 18 for engagement with the arms 14 of the fork lift truck 11. Each threaded member 52 has a screw lock handle 54 which may be rather wide to give the necessary leverage when tightening the screw lock handle 54 which extends externally of the frame 12 so that ia may be easily tightened and loosened from engagement with the fork lift truck 11.

In this manner once the fork lift truck has the arms 14 in the respective housings 18 the driver or a helper may rotate the handles 54 in a conventional manner thereby progressively clamping the arms 14 by the threaded member 52. This provides in an easy manner the quick clamping and unclamping of the frame 12. The inventor has found that sufficient clamping force can be applied to permit the fork lift truck 11 to pull the wheeled container without loosening the locking means 40.

To further safeguard that the frame 12 is held firmly in place safety ties 56 may be provided in the form of a chain which are secured at one end to the frame 12 as by anchor means 58 in the form of an anchor member secured to the upper surfaces 20 of each housing 16. The other end of the safety tie 56 is adapted to be secured to the fork lift truck 11.

When the wheeled container or vehicle is parked, it usually has its brakes on and before it could be towed to another location it is necessary that the brakes which are air actuated be released. To accomplish this the device 10 is provided with releasing means 60 mounted on the frame 12 for controlling the air brakes on the wheeled container. The releasing means 60 includes an air tank 62 which may be cylindrical in shape and supported between the spaced apart walls 24 and having an air gauge 64 and a filling valve 66 so that the air tank 60 may be pressurized and the air pressure gauge 64 viewed when the air is entering through the air tank fill valve 66.

In order to be assured that the air lines from the releasing means 60 does not become entangled with the wheeled container spacing means 70 is provided which includes a forwardly extending spacing member 72 which extends from the air tank 62 in the direction of the fork lift truck 11 and generally below the surface 20 of frame 12. At the forward end of the spacing means 70, control valve means 74 is mounted which connects the air tank 62 to the pair of air hoses 76 and 78 which are operable from the fork lift truck 11 for regulating the control valve 74 for selectively controlling the air flow from the tank 62. To accomplish this task flexible member 80 may be clamped to a portion of the fork lift truck 11 and the valve 74 is of the type that movement of the flexible member 80 opens and closes the valve 74 and can direct the air into air hose 76 or 78.

In this manner once the frame 12 is clamped in position, the driver of the fork lift truck can have the hoses 76 and 78 attached to the glad hands on the wheeled container and by maneuvering the flexible member 80 can release one or two sets of air brakes thereon and then move the wheel container to another destination. In this manner a simple yet sturdy device 10 is adapted to be used when required with a minimal of effort by the user and provides the means thereon to release the air brakes from the wheeled container.

Although an illustrative embodiment of the invention has been described in detail herein with reference to the accompanying drawings, it is to be understood that the invention is not limited to the precise embodiment, and that various changes and modifications may be effected therein without departing from the scope or spirit of the invention.

I claim:
1. A portable, self-contained fifth wheel device for detachable mounting on a vehicle, such as a fork lift truck or the like, for towing a wheeled container, such as a trailer, comprising:
   a. a frame for detachable connection on a wheeled vehicle of the type having a pair of spaced apart support arms, said frame having a pair of spaced apart, oppositely disposed housings with a front end and a rear end and including elongated hollow channels for receiving a corresponding pair of support arms therein from said rear end;
   b. said frame including an upper surface and a lower surface with a fifth wheel pivotally mounted to said upper surface of said frame for detachable connection to a wheeled container;
   c. locking means supported by said frame for selective engagement with said support arms when disposed in said housing channels, each of said channels includes members secured thereto in confronting relation to a respective one of said arms for clamping said support arms therebetween;
   d. said locking means further includes:
      i. a first threaded socket extending into the hollow channel on each of said housing along the lower surface thereof,
      ii. a second threaded socket extending into said hollow channel on each of said housing on a plane transversely of each said first threaded socket, and
      iii. a threaded member extending through each of said threaded sockets into the housing for engagement with the arms of the fork lift truck and having a screw lock handle externally of said frame for locking said frame in place relative to the arms of the fork lift truck;
   e. releasing means mounted on said frame for controlling air brakes on the wheeled container, said means including:
      i. an air tank mounted between said housings and comprising a pressure gauge mounted thereon with an air tank fill valve,
      ii. at least one air hose connected to said air tank at one end thereof and adapted to be connected to the wheeled container, and
      iii. valve means connected between said air tank and said air hose and operable from the fork lift truck for regulating said valve for selectively controlling the air flow;
   f. anchor means secured to each of said oppositely disposed housings to extend above said upper surface;
   g. safety ties secured at one end to said anchor means and the opposite end adapted to be secured to the fork lift truck or the like, said safety ties include spaced apart chains secured to each of said anchor means; and
   h. spacing means extending rearwardly from said air tank to said valve means in the direction of the fork lift truck or the like, so as to prevent the wheeled container from accidentally engaging said air hose, said spacing means extending beyond said rear end.

2. A fifth wheel device in accordance with claim 1, wherein said frame includes transversely extending members joining together said elongated hollow channels.

3. A fifth wheel device in accordance with claim 2, and further including a flexible member connected to said valve means and extending to the fork lift truck or the like to permit manual control of the releasing means therefrom.

* * * * *